US012779387B2

(12) United States Patent
Dabruck et al.

(10) Patent No.: US 12,779,387 B2
(45) Date of Patent: Nov. 3, 2026

(54) METHOD FOR CLEANING A FILTER IN A FILTER DEVICE, AND FILTER DEVICE HAVING A FILTER HOUSING

(71) Applicant: Becker Additive Manufacturing Solutions GmbH, Puchheim (DE)

(72) Inventors: Markus Dabruck, Wuppertal (DE); Pascal Goertz, Wuppertal (DE); Christian Radau, Schwelm (DE); Bernhard Radermacher, Korschenbroich (DE); Evdokimos Tsipras, Wuppertal (DE)

(73) Assignee: Becker Additive Manufacturing Solutions GmbH, Puchheim (DE)

( * ) Notice: Subject to any disclaimer, the term of this patent is extended or adjusted under 35 U.S.C. 154(b) by 339 days.

(21) Appl. No.: 18/568,892

(22) PCT Filed: Jun. 8, 2022

(86) PCT No.: PCT/EP2022/065451
§ 371 (c)(1),
(2) Date: Dec. 11, 2023

(87) PCT Pub. No.: WO2022/268497
PCT Pub. Date: Dec. 29, 2022

(65) Prior Publication Data

US 2024/0269598 A1 Aug. 15, 2024

(30) Foreign Application Priority Data

Jun. 23, 2021 (DE) ..................... 10 2021 116 264.5

(51) Int. Cl.
*B01D 46/48* (2006.01)
*B01D 46/00* (2022.01)
(Continued)

(52) U.S. Cl.
CPC ......... *B01D 46/48* (2013.01); *B01D 46/0093* (2013.01); *B22F 10/28* (2021.01); *B29C 64/364* (2017.08); *B33Y 40/00* (2014.12)

(58) Field of Classification Search
CPC .... B01D 46/48; B01D 46/0093; B01D 46/70; B01D 46/71; B01D 46/715; B33Y 40/00; B29C 64/364; B22F 10/28
See application file for complete search history.

(56) References Cited

U.S. PATENT DOCUMENTS 7,351,273 B2 4/2008 Handte
10,697,298 B2 6/2020 Kraft et al.
(Continued)

FOREIGN PATENT DOCUMENTS

CN 109248508 A 1/2019
DE 103 50 395 A1 6/2005
(Continued)

OTHER PUBLICATIONS

International Search Report in PCT/EP2022/065450, mailed Oct. 20, 2022.
(Continued)

*Primary Examiner* — Robert Clemente
(74) *Attorney, Agent, or Firm* — Collard & Roe, P.C.

(57) ABSTRACT

A method for cleaning a filter in a filter device, which includes a filter housing and the filter located in the filter housing, the filter device having a removable filtered-material collection chamber, into which filtered material arising during the cleaning of the filter is transferred. A filter device has a filter housing and a filter located in the filter housing, and a removable filtered-material collection chamber, into which filtered material arising during the cleaning of the filter is transferred. A separable space is provided upstream of the filtered-material collection chamber in the transfer
(Continued)

direction of the filtered material, in which space the cleaned-off filtered material is treated in order to reduce remaining reactivity.

9 Claims, 16 Drawing Sheets

(51) Int. Cl.

| | |
|---|---|
| ***B22F 10/28*** | (2021.01) |
| ***B29C 64/364*** | (2017.01) |
| ***B33Y 40/00*** | (2020.01) |

(56) References Cited

U.S. PATENT DOCUMENTS

| | | | | |
|---|---|---|---|---|
| 2013/0259758 | A1 * | 10/2013 | Herding ................. | B01D 46/38 55/303 |
| 2021/0122117 | A1 | 4/2021 | Schade et al. | |
| 2022/0362691 | A1 | 11/2022 | Radermacher et al. | |
| 2023/0079987 | A1 | 3/2023 | Herding et al. | |
| 2023/0142672 | A1 | 5/2023 | Kleinhans et al. | |
| 2023/0330581 | A1 | 10/2023 | Herding et al. | |

FOREIGN PATENT DOCUMENTS

| | | | |
|---|---|---|---|
| DE | 10 2006 012 933 | A1 | 9/2007 |
| DE | 20 2012 013 036 | U1 | 8/2014 |
| DE | 10 2015 107 721 | A1 | 11/2016 |
| DE | 10 2015 118 746 | A1 | 5/2017 |
| DE | 10 2017 206 792 | A1 | 10/2018 |
| DE | 10 2017 207 415 | A1 | 11/2018 |
| DE | 10 2020 102 034 | A1 | 5/2021 |
| DE | 10 2019 132 349 | A1 | 6/2021 |
| WO | 2021/151681 | A1 | 8/2021 |
| WO | 2021/151938 | A1 | 8/2021 |

OTHER PUBLICATIONS

International Search Report in PCT/EP2022/065451, mailed Jul. 27, 2022.

* cited by examiner

METHOD FOR CLEANING A FILTER IN A FILTER DEVICE, AND FILTER DEVICE HAVING A FILTER HOUSING

CROSS REFERENCE TO RELATED APPLICATIONS

This application is the National Stage of PCT/EP2022/065451 filed on Jun. 8, 2022, which claims priority under 35 U.S.C. § 119 of German Application No. 10 2021 116 264.5 filed on Jun. 23, 2021, the disclosure of which is incorporated by reference. The international application under PCT article 21 (2) was not published in English.

TECHNICAL FIELD

The invention relates firstly to a method for cleaning a filter in a filter device having a filter housing and the filter located therein, the filter device having a removable filtered material collecting chamber into which filtered material that accumulates in the course of cleaning the filter is transferred.

The invention further relates to a filter device having a filter housing and a filter located therein, wherein the filter device has a removable filter material collecting chamber into which filter material that accumulates in the course of cleaning the filter is transferred.

PRIOR ART

In metal printing devices, such as laser sintering or laser melting devices, further, for example, so-called 3D laser printing devices, it is known to supply process gas to the enclosure of the printing device using a circulation process, which process gas is cleaned or regenerated in a filter device with regard to impurities (for example smoke) resulting in particular from the high heat exposure during the metal printing process, which can arise in particular due to the laser application.

The production of a printed piece in the metal printing device preferably takes place in a protective gas atmosphere achieved by the process gas. For example, an inert gas, such as argon or nitrogen, is generally used as the process gas, with argon or nitrogen further being used as the sole gas. In principle, however, a mixture of gases, thus, inert gases in particular, can also be present as the process or protective gas. In general, the aim is for the atmosphere, in particular in the enclosure, to contain no oxygen or virtually no oxygen. The medium flowing through the filter device is thus the process gas in the case of the metal printing device.

Depending on the size and/or complexity of the printed piece to be produced, such a printing process can well extend over several hours or even several days.

A metal printing device is known, for example, from DE 10 2017 206 792 A1. In connection with a filter device, such a metal printing device has become known, for example, from DE 20 2012 013 036 U1. A method for cleaning a filter is known from DE 10 2015 118 746 A1. Moreover, DE 10 2019 132 349 A1 describes a filter device of the type in question and a method for cleaning the filter.

The filtered material accumulating in the course of cleaning the filter in the filter cleaning process generally consists of a highly reactive material. Accordingly, in the course of disposing of the filtered material, there is an increased risk of ignition when it leaves the protective gas atmosphere provided by the process gas.

In this context, it is known, in particular for smaller systems, to use disposable filters that are disposed of when a predetermined filling level is reached. It is also known to flood in particular disposable filters having a larger holding volume with water and/or oil, whereby a passivation of the filter material is achieved. The disposable filter can then be removed from the housing and disposed of. After cleaning, the housing is fitted with a new disposable filter.

Also known in this regard are solutions in which a fire prevention agent, such as lime or glass granules, is continuously blown into the filter housing so that the entire surface of the filter is wetted and mixed with the material filtered out at the filter. During the cleaning process, this mixture of filtered material and fire prevention agent is transferred to a filtered material collecting chamber. However, with each cleaning process of the filter, this results in a comparatively relatively high amount of waste, which results in a comparatively frequent emptying of the filtered material collecting chamber.

Cleaning the filter by spraying with oil is problematic with respect to disposal.

From DE 10 2020 102 034 A1, a device and a method for cleaning a filter is known. Only the filtered material collecting chamber is provided, which can be a disposable container intended for single use. Before entering the filtered material collecting chamber, the filtered material is not treated with regard to reactivity.

Furthermore, known from DE 10 2017 207 415 A1 is a device and a method for cleaning a filter. Here, the filtered material also untreated and placed in a collecting container and then fed to a treatment chamber downstream of the collecting container.

SUMMARY OF THE INVENTION

Starting from a prior art, such as provided by DE 10 2020 102 034 A1, it is the object of the invention to improve a method and a filter device of the type in question, in particular with regard to filter cleaning, taking into account the usually high reactivity of the filtered material.

In order to achieve the object, it is in first instance substantially intended that oxygen is injected for passivation, wherein the oxygen is blown into the space or alternatively sucked into the space by an appropriate application of negative pressure, wherein the oxygen is introduced by means of atmospheric air and at the same time, a swirling of the filtered material is carried out in the space, and further that the atmospheric air is used both for passivation of the filtered material and for transport into the collecting chamber by blowing the filtered material out of the reactor space.

Another solution is based in particular on the fact that upstream of the filtered material collecting chamber in the transfer direction of the filtered material, a separable space is provided in which the cleaned filtered material is treated with regard to the reduction of any reactivity still present, that a swirling of the filtered material is created in the space, and that the filtered material collecting chamber is removed from the filter device after a certain time, in particular after multiple cleaning cycles, and the contents are fed to a disposal system.

With regard to the filter device, the object is achieved in particular intended that the filtered material collecting chamber can be removed from the filter device after a cleaning cycle in order to feed the contents to a disposal system, and that atmospheric air can be injected into the space, wherein, in addition to passivation, a swirling and also transfer of the filtered material into the filtered material collecting chamber can be carried out by means of the atmospheric air.

As a result of the proposed method and the proposed configuration of the filter device, passivation of the filtered material removed from the filter can be achieved before the transfer to the filtered material collecting chamber. In this manner, targeted passivation can also be carried out in the provided separable space, which acts in the manner of a reactor, in the cleaning cycle of the filter and integrated into the cleaning method.

The treatment of the filtered material to be carried out in the space preferably separable in a gate-like manner can be carried out to such an extent that the filtered material is finally completely or almost completely passivated with regard to its reactivity. Also, , such treatment can only lead to partial passivation, so that when the treated filtered material is transferred to the filtered material collecting chamber, a comparatively low reactivity of the filtered material may still be present. In this case, as a result of the treatment of the filtered material previously carried out in the space, a post-passivation of the filtered material can be automatically carried out in the filtered material collecting chamber.

The space provided for this purpose can in particular be separated from the filter housing comprising the filter. To create such a separation, for example, a valve can be provided which, furthermore, is controlled by negative pressure, for example. By opening the valve, filtered material which may have previously been detached from the filter in the cleaning process, can be transferred from the filter housing into the reactor space.

Preferably, a comparatively small amount of filtered material is passivated in this space, more preferably the amount of filtered material that accumulates in the course of a cleaning process.

Intermediate storage of the highly reactive filtered material is provided in the space for treating the filtered material before transferring it to the filtered material collecting chamber, in particular for reducing the reactivity of the filtered material. During this treatment of the filtered material, the filter provided in the filter housing can still be used in an advantageous manner for filtering the process gas flowing through the metal printing device until a preferably predetermined filtered material holding volume is reached again.

The filtered material that accumulates in the filtered material collecting chamber over time, in particular over multiple cleaning cycles, can finally be disposed of in the simplest possible manner by emptying the collecting chamber and, if necessary, transferring it to a transport container or the like, as a result of the passivation of the filtered material that has already been carried out.

In one possible configuration, the filtered material can be treated in the separable space by injecting oxygen. Accordingly, the filter material is preferably brought into contact with oxygen in the reactor space. Here, the oxygen can be blown into the space or alternatively sucked into the space after an appropriate application of negative pressure. The passivating reaction of the filtered material is achieved by the reaction with the oxygen.

More preferably, the filtered material collecting chamber accommodating the substantially passivated filtered material is filled with atmospheric air, so that after the filtered material, which has been acted on by oxygen in the chamber, has been transferred to the collecting chamber, a post-reaction, for example smoldering under an air atmosphere, of the filtered material particles can occur. In conventional production methods, for example 3D metal laser printing methods, there is sufficient time for such a post-reaction since in this case, the next cleaning cycle generally introduces new filtered material into the collecting chamber after about 6 to 48 hours.

According to a preferred method, the oxygen is introduced by means of atmospheric air. Thus, according to a possible configuration, for example, ambient air can be sucked in or blown in for passivating the filtered material temporarily stored in the space.

For further improved passivation of the filtered material in the space, it can be provided that the filtered material is preferably swirled in the space at the same time as oxygen is introduced. This results in improved contact between the surface of the filtered material and the oxygen and thus in an improved reaction. Passivation of the filtered material can thus take place over a shorter period of time compared to passivation without swirling.

According to a preferred configuration, swirling can be achieved by injecting oxygen or atmospheric air. The separable reactor space can have labyrinth-like flow paths that lead to the desired swirling.

Also, by injecting the oxygen or atmospheric air and the by the swirling preferably effected in the process of this, a superimposed transfer of the filtered material into the filtered material collecting chamber can also be achieved in addition to the passivation. Accordingly, in a preferred configuration, the preferably injected atmospheric air serves both to passivate the filtered material and to transport it into the collecting chamber by blowing the filtered material out of the reactor space.

Due to the targeted reaction with atmospheric oxygen, the filtered material is passivated to such an extent that a hazard during disposal of the filtered material is excluded. The filtered material collecting container is filled with the passivated filtered material and atmospheric air alone, so that the filtered material can be disposed of by simply emptying the collecting container. Such a collecting container is also ready for operation after emptying and corresponding repositioning in the filter device without further preparations, for example evacuation and/or filling measures.

The filtered material collecting chamber can have a usable holding volume of about 5,000, further to about 15,000 $cm^3$, but possibly also up to 20,000 $cm^3$ or more.

Furthermore, in the course of a cleaning that has been carried out, for example, a filtered material volume of about 15 to 25 $cm^3$ can result after about 10 to 14 hours of operation, preferably about 20 $cm^3$ after 12 hours of operation. Assuming a maximum permissible filling of the filtered material collecting chamber with about 3,000 $cm^3$ of filtered material, this results about 120 to 200 permissible filter cleanings or 1,500 to 2,000 operating hours as a change or emptying interval for the collecting chamber. In filter systems with, for example, two filter devices operating in parallel, the time between the cleaning processes is doubled so that with 120 to 200 permissible cleaning processes per filter device, a total operating time of 3,000 to 4,000 hours is achieved so that accordingly each container only has to be removed and emptied after 3,000 to 4,000 hours. In the case of 7-day operation of the entire system with 90% availability, emptying of a collecting chamber may thus advantageously be required only every 6 months.

BRIEF DESCRIPTION OF THE DRAWINGS

The invention is explained in more detail below with reference to the accompanying drawing which merely shows an exemplary embodiment. In the figures.

DESCRIPTION OF THE EMBODIMENTS

Figure 1:
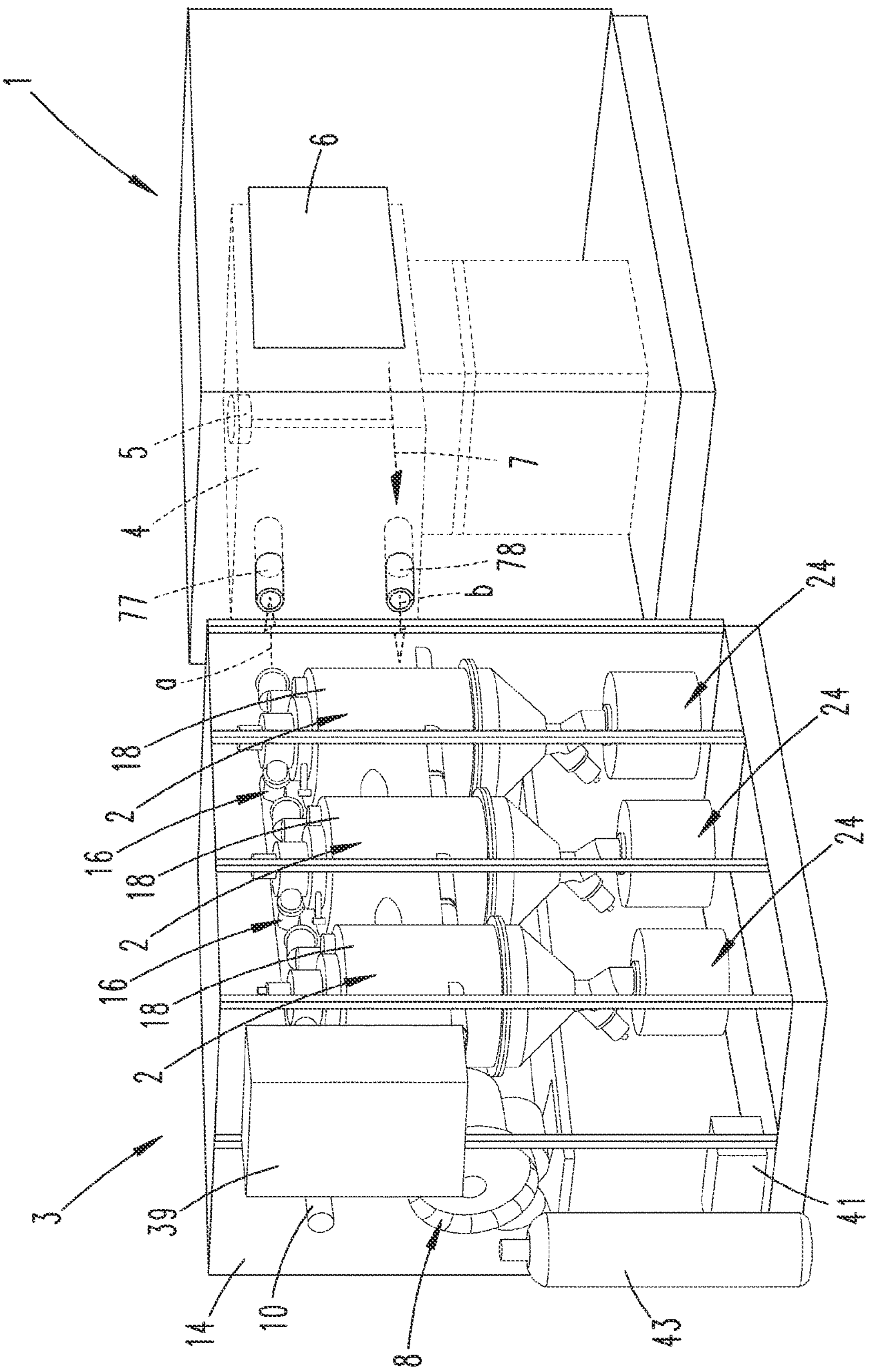
FIG. 1 shows a schematic perspective illustration of a metal printing device with an associated filter module, comprising multiple filter devices.

Illustrated and described, in first instance with reference to FIG. 1, is a metal printing device 1 with an associated filter module 3 having a multiplicity of filter devices 2.

The metal printing device 1 has first and foremost an enclosure 4 in which the metal printing process can be carried out. In this case, as a result of selective laser melting, a desired component is produced layer by layer from fine metal powder under the action of a laser beam. The production can be based here directly on so-called 3D-CAD data such that fully functional components can be manufactured from high-quality metals.

In addition to the laser device 5, which is shown only schematically in FIG. 1, an application device for applying a metal powder layer is also substantially part of the printing device, as is a powder storage container, and also a powder collecting container into which excess powder can be stripped.

The production of the metal part is carried out in an enclosure 4 which is closed on all sides, for which purpose the enclosure can optionally be provided with a door 6 or the like which closes the enclosure 4.

With regard to the production process, reference is made, for example, to DE 10 2017 206 792 A1 cited at the beginning.

During the printing process, regeneration of the atmosphere in the enclosure 3 preferably takes place. For this purpose, a gaseous process gas 7, which is preferably a protective gas such as argon or nitrogen, is preferably blown into the enclosure 4 in a circulation process and simultaneously extracted. A fan 8, for example in the form of a circulation fan, is preferably used for this purpose. The fan 8 can be a so-called side channel compressor or the like.

In the illustrated exemplary embodiment, the fan 8 is arranged in the filter module 3 in spatial association with the filter devices 2.

With regard to the method for cleaning the filter as well as with regard to the design of the filter device, reference is made to the document DE 10 2019 132 349 A1 mentioned at the beginning. The disclosure content of this patent application is also hereby included in full in the disclosure of the present invention, including for the purpose of incorporating features of this patent application in claims of the present invention.

As can further be seen, in particular also from the schematic illustration in FIG. 1, the fan 8 is fluidically connected to the interior of the enclosure via a pressure line 9 and a suction line 10 as well as an inlet 77 and an outlet 78.

Figure 2:
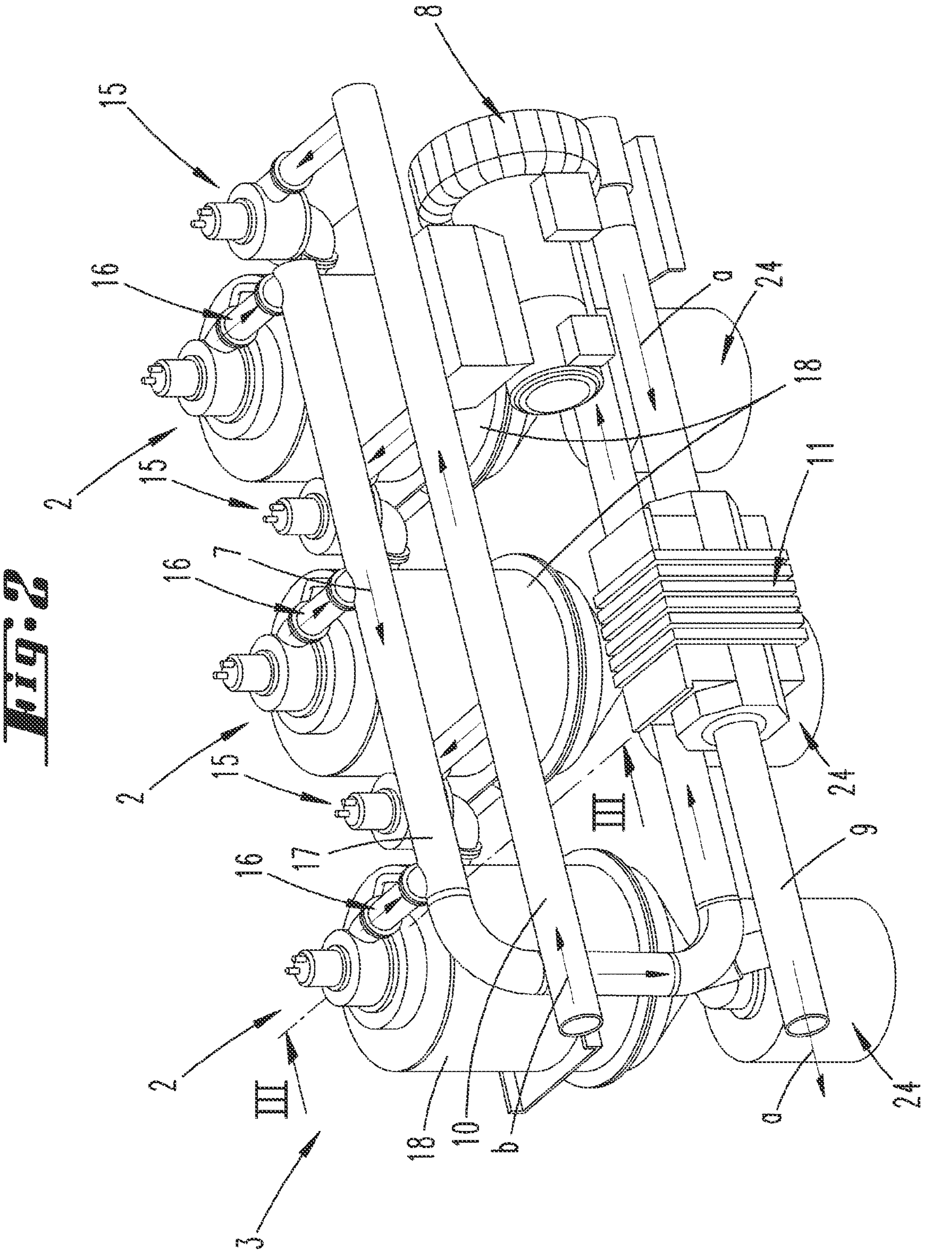
FIG. 2 shows a perspective illustration of the arrangement of three filter devices fluidically connected in parallel, with a circulation fan and a medium cooler.

Here, the pressure line 9, extending from the fan 8, can lead directly into the enclosure 3, if necessary, with interposition of a medium cooler 11, as shown in FIG. 2, and preferably associated with a ceiling region of the enclosure 3. In operation, a direction a of the pressure flow of the medium 7 occurs in the pressure line 9.

At least one filter device 2 is looped into the suction line 10 upstream of the fan 8, corresponding to a direction of flow of the process gas 7. According to the exemplary embodiment shown, multiple filter devices 2, here three of them, can be provided.

The filter devices 2 together with the fan 8 and the possibly provided medium cooler 11, and furthermore, if necessary, with an optionally provided pre-separator 12 and/or a micro filter, can be arranged in the filter module 3 in a combined manner. This filter module 3 can include a filter housing 14 which comprises the elements described above. There may be only two interfaces associated in each case with the pressure line 9 and the suction line 10.

A possibly provided pre-separator can be provided upstream of the one filter device 2 or the multiple filter devices 2, as viewed in the direction of flow of the process gas 7, while the micro filter can be provided downstream with respect to the filter device 2 in the direction of flow.

In a usual production process and an associated process gas circulation, a direction b of the suction flow occurs in the suction line 10.

The filter devices 2 are preferably provided in substantially identical design, in this case each having one medium inlet 15 and one medium outlet 16. Each filter device 2 is preferably directly connected to the suction line 10 via the respective medium inlet 15. The medium outlets 16 of the filter devices 2 lead into a suction transfer line 17, which leads to the fan 8, possibly with interposition of the micro filter (see in particular FIG. 2).

The micro filter can also be provided, for example, in the flow direction at the end of the pressure line 9, and possibly also in the flow direction downstream of the medium cooler 11.

Figure 3:
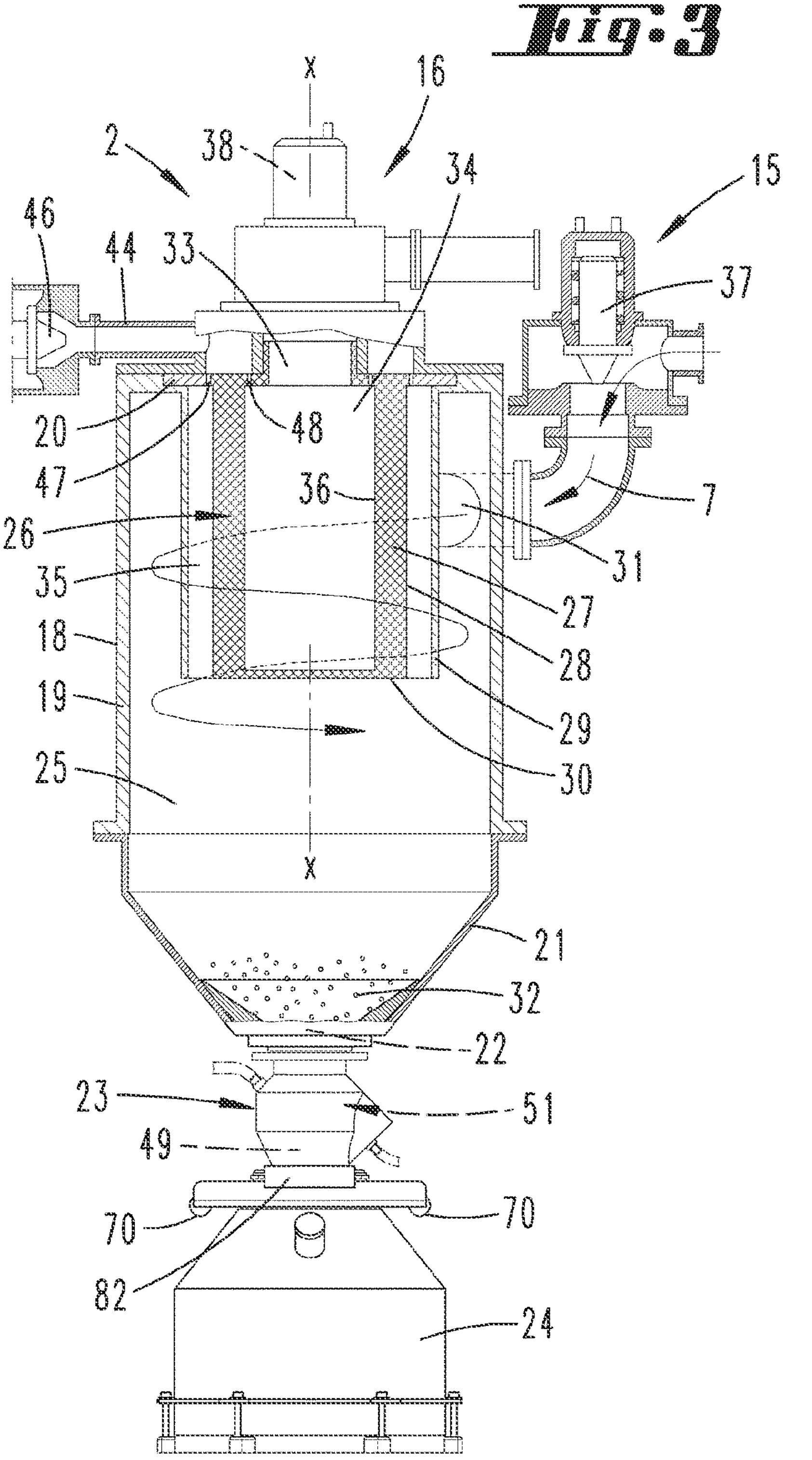
FIG. 3 shows a schematic sectional view through a filter device according to line III-III in FIG. 2, relating to a method step for filtering a medium flowing through the filter device.
Figure 4:
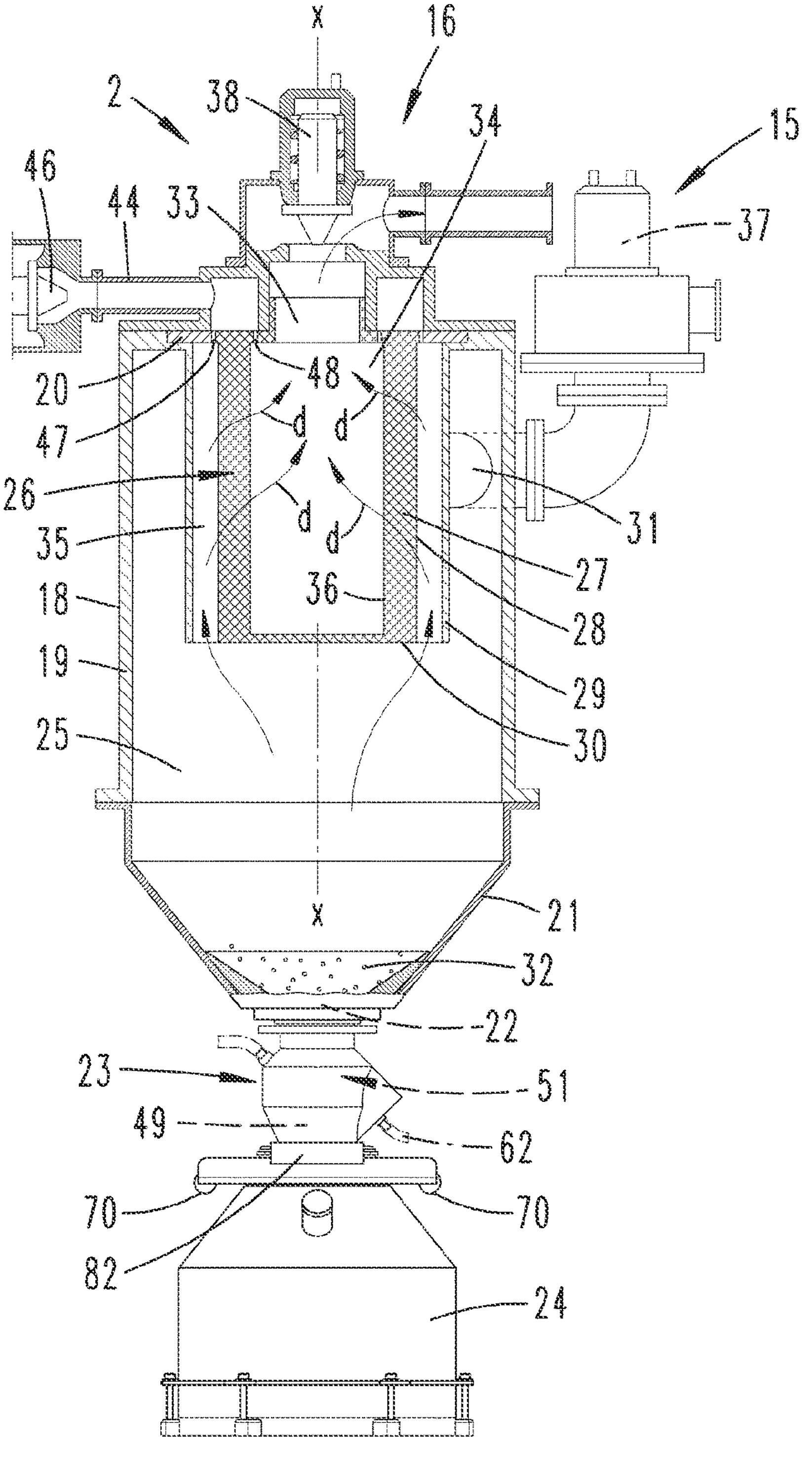
FIG. 4 shows a sectional view according to FIG. 3, but relating to an offset sectional plane.

FIGS. 3 and 4 each show a vertical sectional view—with respect to the usual operating position of the filter device 2—through one of the filter devices 2 in regeneration mode, in which filtering of the medium 7 discharged from the enclosure 4 and, for example, contaminated by smoke, is carried out.

As can be seen, for example, from the sectional view in FIG. 3, the filter device 2 can have an approximately circular-cylindrical filter housing 18 with a circumferential housing wall 19 and a housing ceiling 20. The housing base 21 can be funnel-shaped with a central base opening 22 to which a reactor portion 23 and a filtered material collecting chamber 24, which can be removed from the filter housing 18, can be connected in a transfer direction g of a filtered material 32.

A gate valve 51 loaded into a closed position via a compression spring 50 is arranged between the filter housing 18 and the space 49 formed in the reactor portion 23.

According to the illustrations, a filter 26 projecting into the interior 25 of the filter housing 18 can be arranged on the underside of the housing ceiling 20. The filter wall thereof, as also shown, can be of tubular, circular-cylindrical design, with a central longitudinal axis x which, in the usual arrangement position, is oriented along a vertical line. In accordance with the illustrated exemplary embodiment, the longitudinal axis x of the filter 26 can also form the central longitudinal axis of the filter housing 18 as a whole.

The filter 26 is surrounded, at a distance from the outer surface 28 of the filter wall 27, by a guide wall 29 which is preferably aligned concentrically with respect to the longitudinal axis x. This guide wall 29, like the filter 26, is virtually suspended from the underside of the housing ceiling 20 and is preferably connected thereto in a flow-tight manner. Viewed in the axial direction, the annular space 35 resulting between the guide wall 29 and the filter wall 27 is open towards the interior 25, while the corresponding end face 30 of the filter 26, which points downwards in normal operation, is formed such that it cannot be penetrated by the flow, in particular by the process gas 7. Filtered material 32 separated in the process of this can fall, solely by gravity, through the base opening 22 of the housing base 21 into a channel portion 52 extending into the space 49 of the reactor portion 23. This channel portion 52 is initially closed in the region of the end facing away from the interior 25 of the filter housing 18 by a valve disc 53 of the gate valve 51.

The inlet opening 31 of the medium inlet 15, as is also preferred, can be provided in the housing wall 19, so that an at least approximately tangential inflow of the medium 7 into the interior 25 of the filter housing 18 can arise, whereby in first instance a vortex-like pre-separation of filtered material 32 is achieved (compare FIG. 3). Here, the filter device 2 initially acts in the manner of a cyclone separator, in which the process gas flow, starting from the inlet opening 31, is guided in a vortex-like manner in the annular space resulting between the guide wall 29 and the housing wall 19.

According to the exemplary embodiment illustrated, the outlet opening 33 of the medium outlet 16 can be provided in the region of the housing ceiling 20, in particular, as is also preferred, centrally, taking up the longitudinal axis x and furthermore being associated with the filter interior 34 enclosed by the filter wall 27.

As a result of the suction flow arising in normal operation (filter operation) of the filter device 2, the process gas 7 sucked into the interior 25 is sucked from below into the annular space 35 between the filter wall 27 and the guide wall 29 after the vortex-like deflection associated with the downwardly facing end face 30 of the filter 26, whereupon a penetration of the filter wall 27 from the outer surface 28 to the inner surface 36 of the filter wall 27 occurs (see arrows d in FIG. 4), so that the filtered medium 7 reaches the filter interior 34 and exits the filter device 2 via the outlet opening 33 (compare FIG. 4).

Filtered material 32 separated in the process of this can adhere in the filter wall 27. Any filtered material 32 that falls off through the annular space 35 in the course of this filtering process is preferably collected in the filtered material collecting chamber 24.

As can be seen from the sectional views, for example in FIGS. 3 and 4, the medium inlet 15 and the medium outlet 16 can each be provided with a shutoff valve 37 and 38, respectively, so as to remove the filter device 2 from regeneration mode after shutoff with respect to the suction line 10 and the suction transfer line 17. In such a state, the regeneration of the process gas 7 with the metal printing device 1 still being in operation is taken over solely by the further filter devices 2 of the filter module 3. In this manner, at least approximately continuous operation of the metal printing device 1 can be ensured even in the event of a failure or deliberate shutoff of a filter device 2, for example for cleaning the same.

For this purpose, the preferably pneumatically operable shutoff valves 37 and 38 of the medium inlet 15 and the medium outlet 16 are brought into a shutoff position. The control of the shutoff valves 37 and 38 in this respect can, and preferably does, take place via control electronics 39 which are not shown in more detail and which can also be part of the filter module 3.

For cleaning the filter 26 in the filter device 2 and for removing the filter cake settling on the filter wall 27 in the course of filtering the process gas 7, the filter device 2 can be set to a regeneration mode. For this purpose, as described above, the filter device 2 is first removed from the flow of process gas or is shut off from the lines by closing the shutoff valves 37 and 38 and thus closing the medium inlet 15 and the medium outlet 16.

Figure 5:
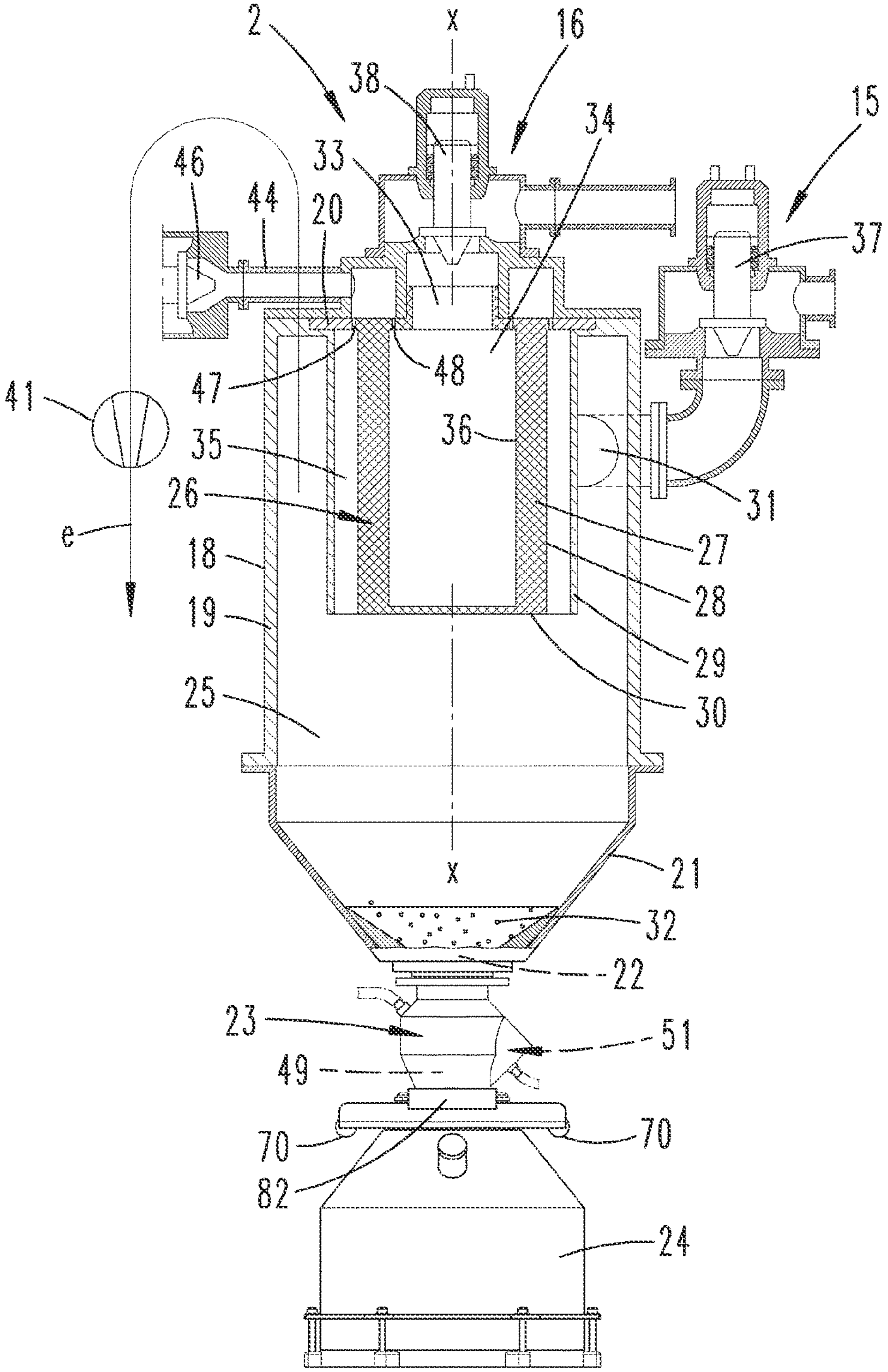
FIG. 5 shows a sectional view through the filter device corresponding to FIG. 3, relating to a method step for evacuating the interior of a filter housing.

In preparation for the cleaning process, a negative pressure is first produced in the filter housing 18 via a separate pump, in particular vacuum pump 41. In doing so, the interior 25 of the filter housing 18 shut off by the gate valve 51 in the reactor portion 23 is evacuated (see schematic illustration in FIG. 5—arrow e).

The vacuum pump 41, which can preferably also be part of the filter module 3, can be, as is furthermore preferred, an oil-lubricated vacuum pump, for example, such as the one known from, for example, DE 10 2015 107 721 A1.

Upon reaching a negative pressure of, for example, 500 mbar up to, for example, 1 mbar in the region of the interior 25 (detectable via a pressure sensor), the suction process via the vacuum pump 41 is stopped via the control electronics 29.

Figure 6:
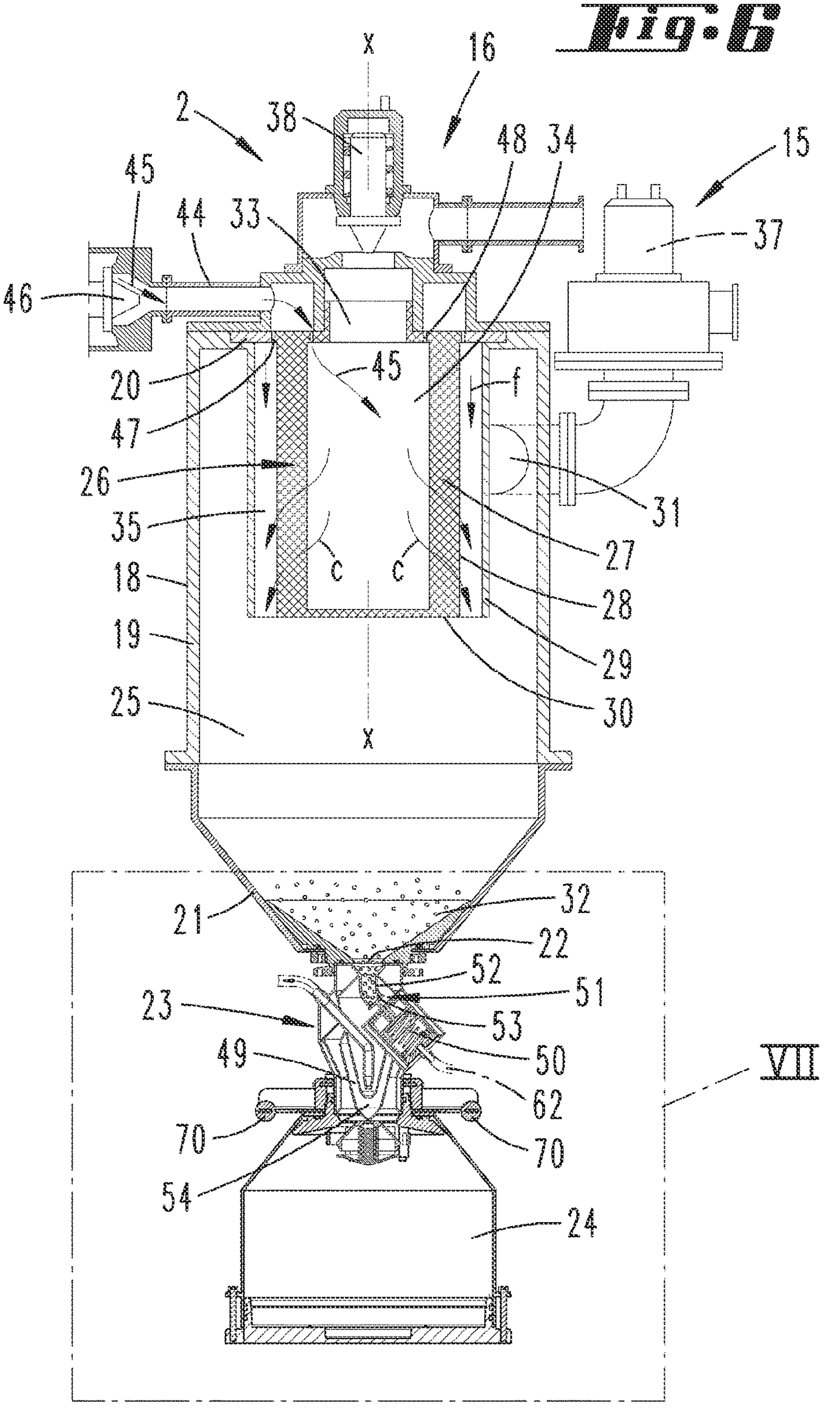
FIG. 6 shows a sequential illustration of FIG. 5, relating a method step for cleaning a filter in the filter housing of the filter device and collecting the separated filtered material upstream of a gate valve.

Via a separate flushing medium reservoir 43, which can also be part of the filter module 3, a flushing medium 45 is introduced towards the filter wall 27 via a flushing line 44 for cleaning the filter 26. Introducing the flushing medium 45 can be triggered by a preferably electrically actuated control valve 46 (see FIG. 6). The control valve 46 can be controlled via the control electronics 39.

As a result of, for example, a plurality of flushing medium inlets 47 and 48 provided around the longitudinal axis x in the housing ceiling 20, the flushing medium 45 can be introduced, wherein, according to the illustrations, the flushing medium 45 is introduced into the filter interior 34 via the flushing medium inlets 48 in such a manner that it passes through the filter wall 27 in a direction c opposite to the throughflow direction of the medium 7 in normal filter operation (direction d—compare FIG. 4). Accordingly, penetration of the filter wall 27 by the flushing medium 45 from the inner surface 36 towards the outer surface 28 is thus achieved.

At the same time or also delayed with respect to the flow described above, the flushing medium 45 is introduced via the radially outer flushing medium inlet 47 substantially along the outer surface 28 of the filter wall 27 (direction f) in order to reliably remove in this manner the filtered material 32, which has been loosened in particular via the flushing medium portion passing through the filter wall 27 from the inside to the outside, from the suction region towards the housing base 21.

The introduction of the flushing medium 45 can be achieved solely as a result of suction due to the negative pressure prevailing in the interior 25 of the filter housing 18 relative to the surroundings but can also be achieved in combination therewith by blowing the flushing medium 45 into the interior 25, if needed. The negative pressure in the interior 25 ensures a favorable flow of flushing medium across and through the filter wall 27.

At the end of the cleaning process, the same pressure as in the connected lines (suction line 10 and suction transfer line 17) preferably prevails again in the interior 25 of the filter housing 18, so that when the shutoff valves 37 and 38 are opened, whereby in the case of this example, the reintegration of the cleaned filter device into the filter process is achieved, no backflow takes place against the usual flow direction of the process gas 7.

Preferably, the same medium is used as flushing medium 45 that is also used as process gas for removing contaminants in the enclosure 4 of the metal printing device 1. For example, argon and/or nitrogen are/is preferably used as flushing medium 45.

By re-evacuating, a second cleaning process can also be carried out immediately after a first cleaning process, if necessary.

The space 49 formed in the reactor portion 23 forms in first instance a funnel-like reaction chamber 54 which narrows in the direction of the filtered material collecting chamber 24. The filtered material 32 collected at the bottom of the filter housing 18, in particular in the region of the channel portion 52, can be discharged into this reaction chamber 54 after a controlled release as a result of opening of the gate valve 51.

Figure 7:
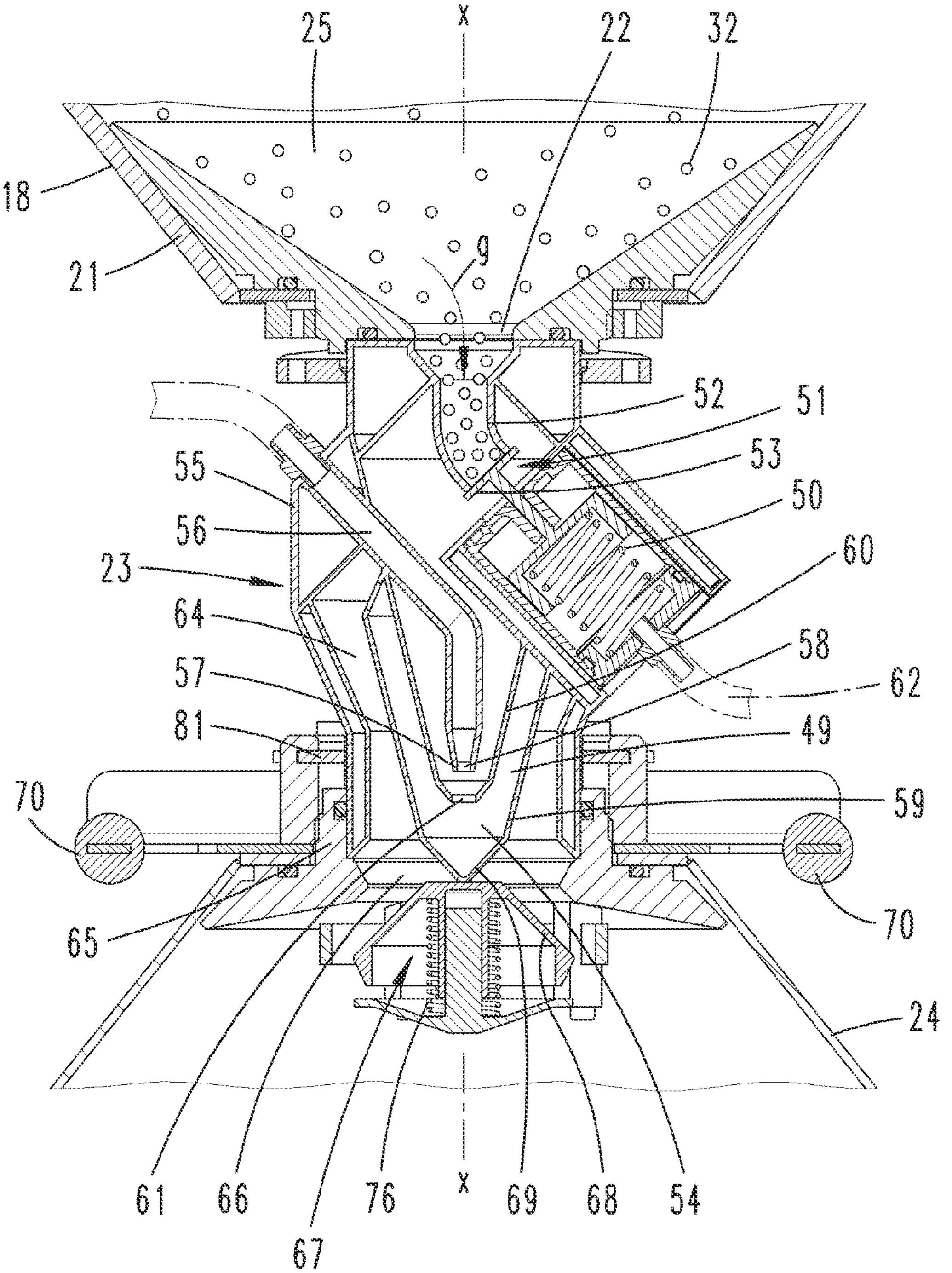
FIG. 7 shows an enlargement of area VII in FIG. 6.

The valve rod carrying the valve disc 53 and the compression spring 50 acting on the valve as a whole are accommodated in a portion of the reactor portion 23 which is separate from the space 49 and can be accessed from the outside, if necessary (see, for example, FIG. 7).

A pipeline 56 fed through the wall 55 of the reactor portion 23 to the outside can open into the reaction chamber 54, which pipeline is preferably connected in a flow-tight manner to a vacuum pump, more preferably to the vacuum pump 41. An end portion 57 of the pipeline 56 facing the base of the reaction chamber 54 preferably extends along the longitudinal axis x wherein, further, a downwardly directed opening 58 of this end portion 57 preferably extends in its opening plane in a direction transverse to the longitudinal axis x.

The reaction chamber 54 is preferably formed overall in a double-walled funnel shape, having a funnel wall 59 located radially on the outside with respect to the longitudinal axis x and a radially inner funnel wall 60, so that the reaction chamber 54 is overall funnel-shaped and formed annular around the longitudinal axis x.

The radially inner funnel wall 60 which, viewed in the axial direction, is located at the top when the filter device 2 is oriented in the usual manner, further has an opening 61 in its bead region. The end portion 57 of the pipeline 56 ends with the opening 58 at an axial distance measure above the opening 61 in the funnel wall 60 corresponding to approximately 1 to 2 times the inner diameter of the pipeline 56.

Preferably, the gate valve 51 is also connected to the vacuum pump 41 via a line 62.

Figure 8:
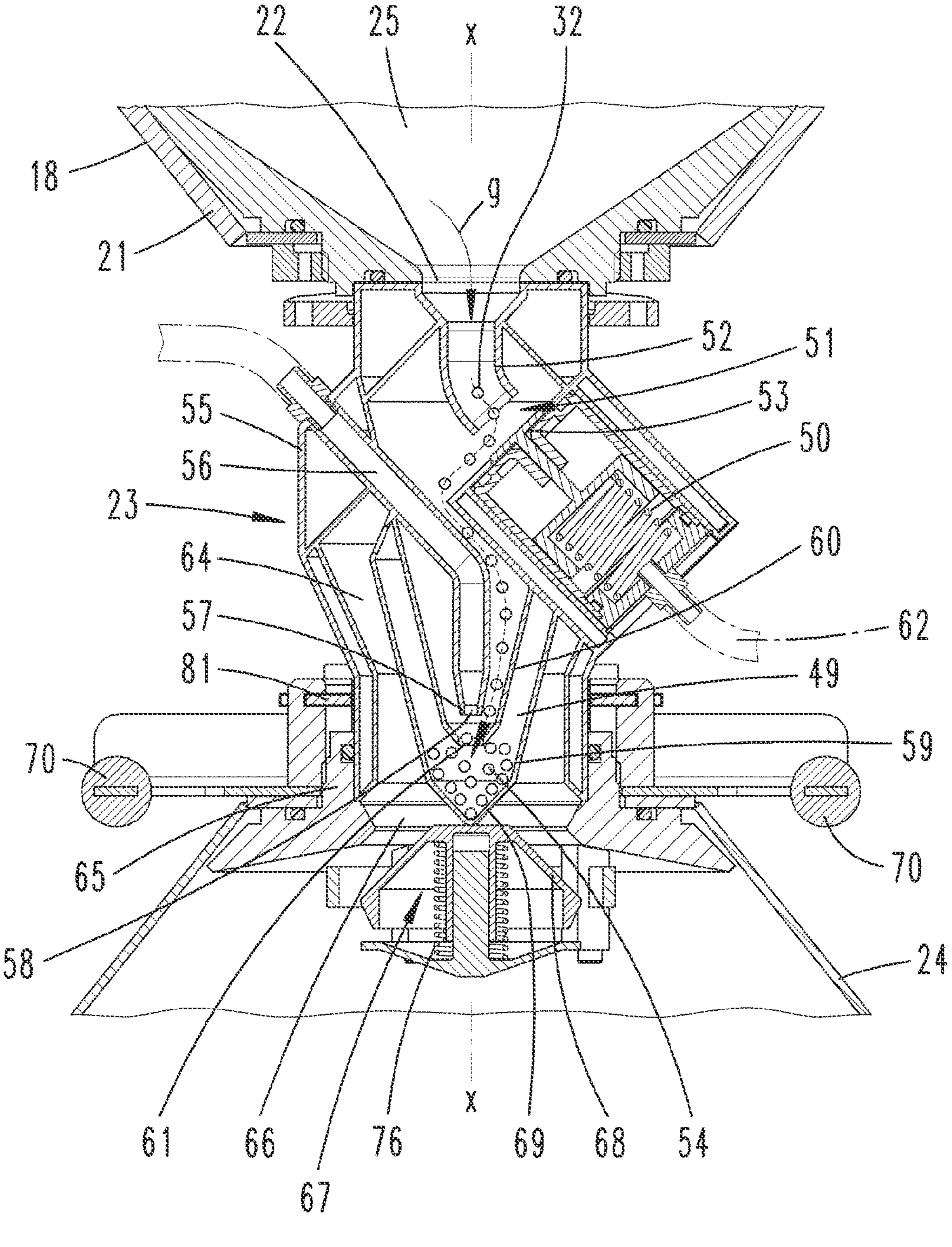
FIG. 8 shows an illustration corresponding to FIG. 7, relating to a situation after opening the gate valve and transferring the filtered material into a separable space interposed between the filter housing and a filtered material collecting chamber.

To discharge the filtered material 32 collected at the base of the filter housing 18 into the space 49 or into the reaction chamber 54 of the reactor portion 23, a negative pressure is generated via the vacuum pump 41 and the pipeline 56 in the reaction chamber 54, and furthermore in the entire space 49 closed off from the filter housing 18 by the closed gate valve 51. This negative pressure can also be used via the line 62 to open the gate valve 51 against the return effect of the compression spring 50. In this case, the gate valve 51 is only opened for a short time, but sufficiently long to suck the filtered material 32 out of the filter housing 18 or the channel portion 52 into the reaction chamber 54 via the negative pressure in the reactor portion 23. The filtered material 32 passes along the radially inner surface of the inner funnel wall 60 into the bead region and passes here through the opening 61. At the end of this transfer process, the filtered material 32 lies on the base side in the funnel-shaped annular reaction chamber 54 (see FIG. 8).

Any slight overpressure in the filter housing 18 at the moment of opening the gate valve 51 reliably excludes an inflow of air from the space 49 of the reactor portion 23.

As soon as the gate valve 51 is closed again, the pipeline 56 is preferably opened to the environment. The air flow now flowing into the vacuum of the space 49 via the pipeline 56, which acts as a flushing nozzle, is directed through the opening 61 into the reaction chamber 54. At the same time, this air flow causes a swirling of the filtered material 32 in the reaction chamber 54 and transport of the filtered material 32 out of the reaction chamber 54 into the filtered material collecting chamber 24 (see FIG. 9).

In the course of this swirling and transport, the filtered material 32 interacts with the oxygen in the atmospheric air 63 that is sucked in and causes the swirling, so that passivation of the usually reactive filtered material particles is achieved, in particular in connection with the swirling.

The filtered material 32 is blown by the air flow—if necessary with further passivation—between the funnel walls 59 and 60 of the reaction chamber 54 upwards in the direction of the widening funnel end and is brought at the end into a radially outer annular space 64 substantially surrounding the reaction chamber 54, out of which, if necessary under further action of the air flow, the filtered material 32 passes into the filtered material collecting chamber 24.

In the filtered material collecting chamber 24, which is under an air atmosphere, the passivated filtered material 32 can safely post-react under atmospheric oxygen until the next cleaning cycle.

According to a preferred configuration, the reactor portion 23 can be produced largely without support structures, for example by 3D metal printing, despite the given complexity of the inner region.

More preferably, a double-walled outer contour can be provided. It can be used for active cooling, furthermore, for example, for water cooling.

The overall tubular free end of the portion of the reactor portion 23 forming the annular space 64, as is also preferred, can be designed to accommodate a sleeve portion 65 of the filtered material collecting chamber 24 in a flow-tight manner. The chamber opening 66 surrounded by the sleeve portion 65 can preferably be closed by means of a shutoff valve 67. A valve cone 68 directed towards the reactor portion 23 can be supported in the docking position of the collecting chamber 24 on the reactor portion 23 on a holding-down means 69, which in the exemplary embodiment shown is formed by the downward-facing surface of the outer funnel walls 59 in the bead region.

Figure 9:
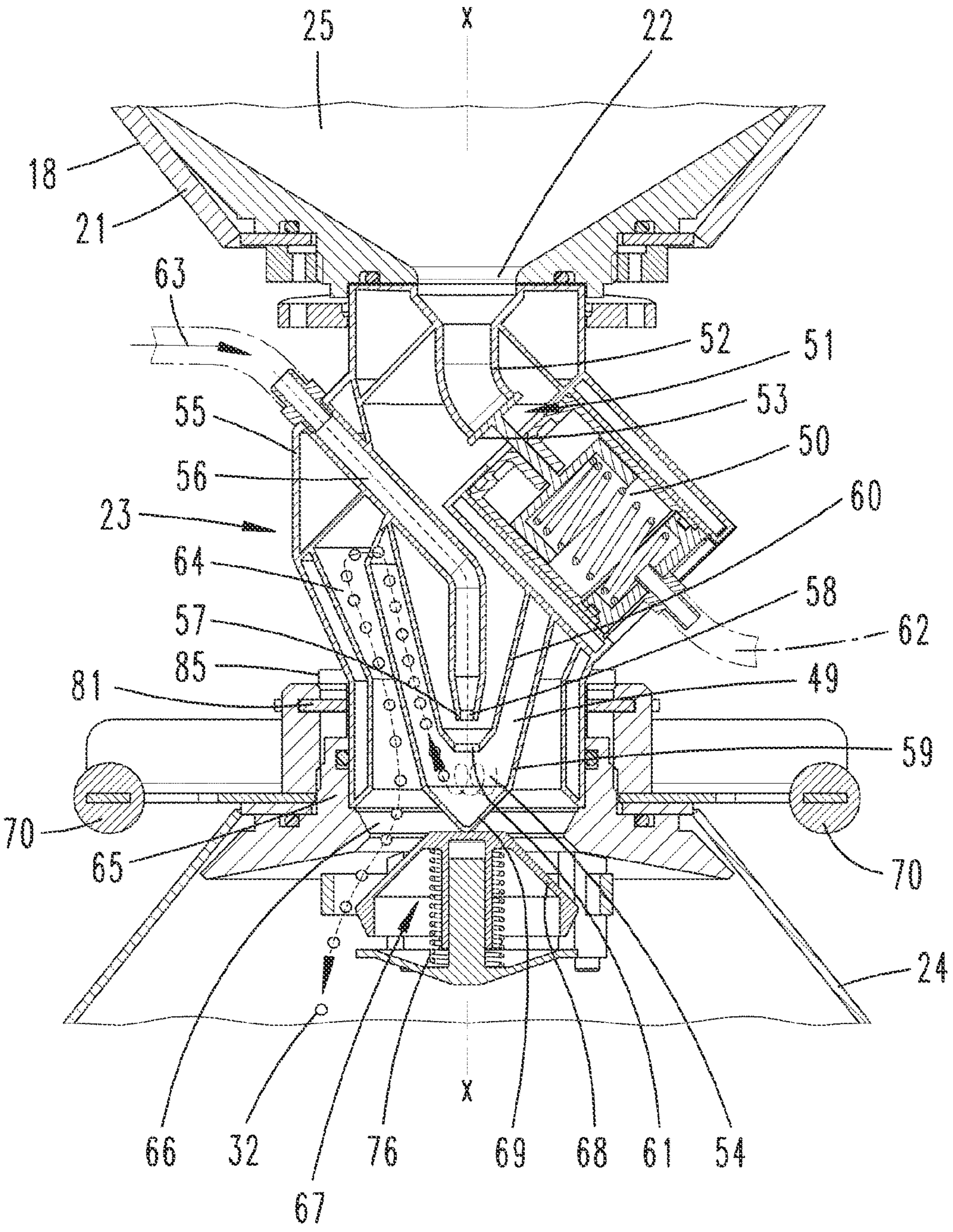
FIG. 9 shows a sequential illustration of FIG. 8, relating to a passivation of the filling material temporarily stored in the space, and the transfer of the filling material into the filtered material collecting chamber.

The shutoff valve 67 is accordingly held in a position releasing the chamber opening 66 (see FIG. 9).

Figure 10:
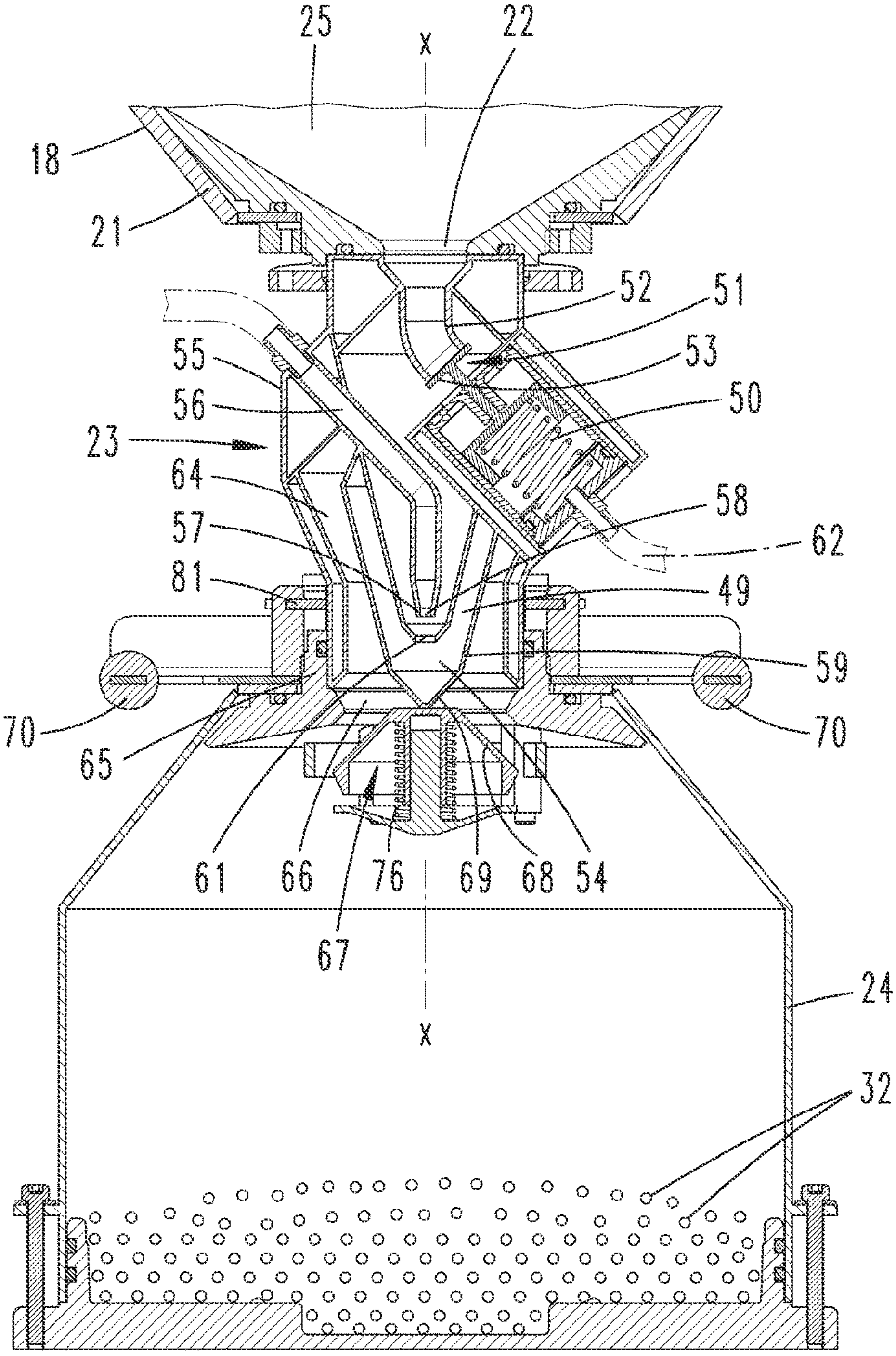
FIG. 10 shows another sectional view relating to a situation and transfer of the passivated filling material into the collecting chamber.
Figure 11:
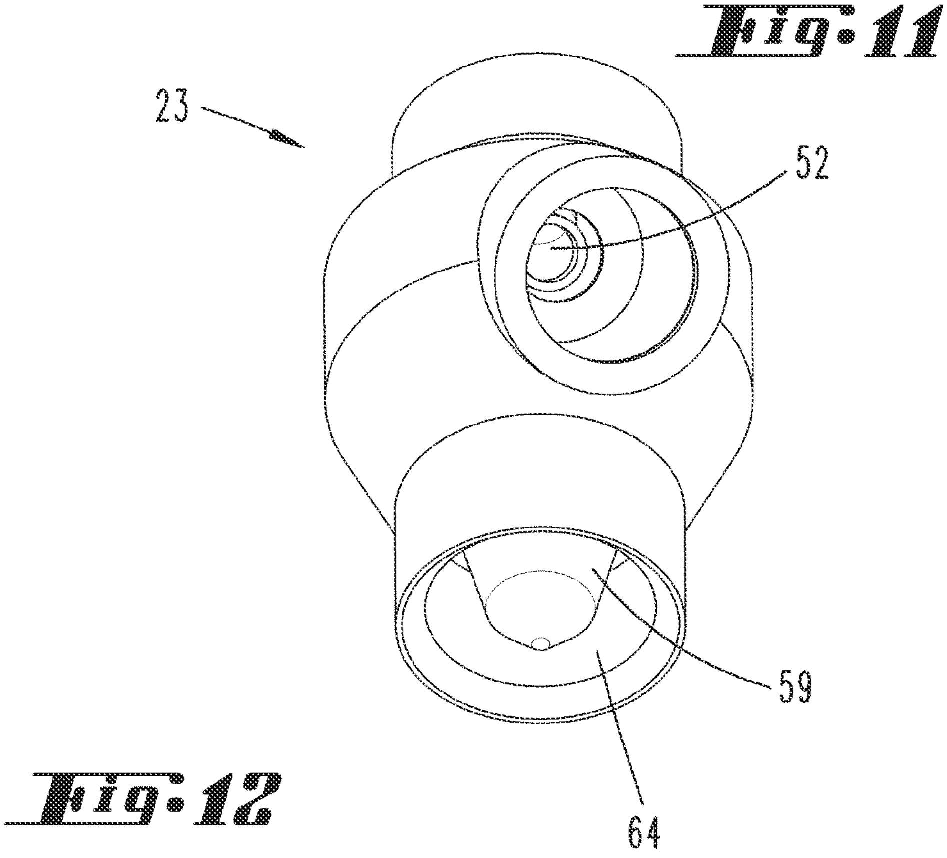
FIG. 11 shows a perspective individual illustration of the reactor having the separable space, interposed between the filter housing and the filtered material collecting chamber.
Figure 12:
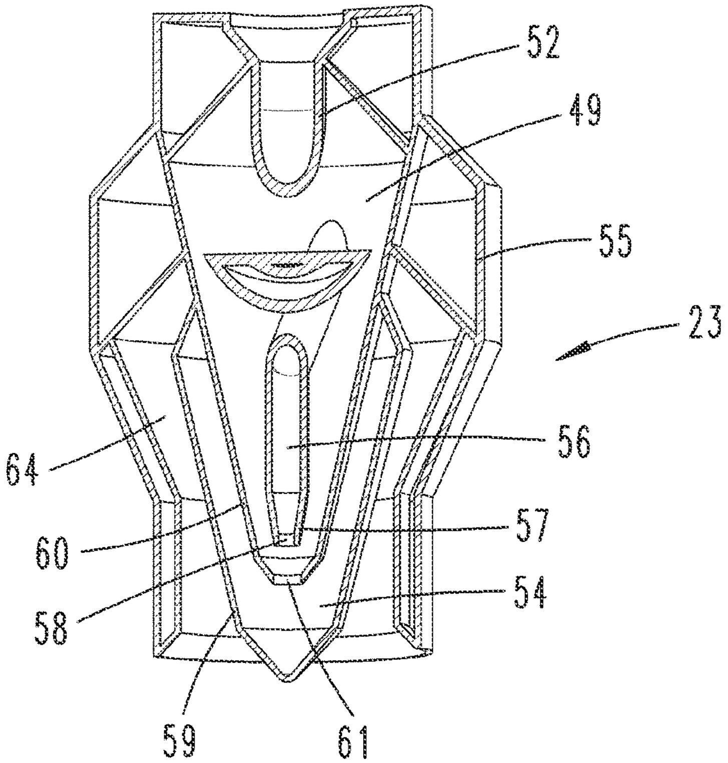
FIG. 12 shows the reactor in a longitudinal sectional view.
Figure 13:
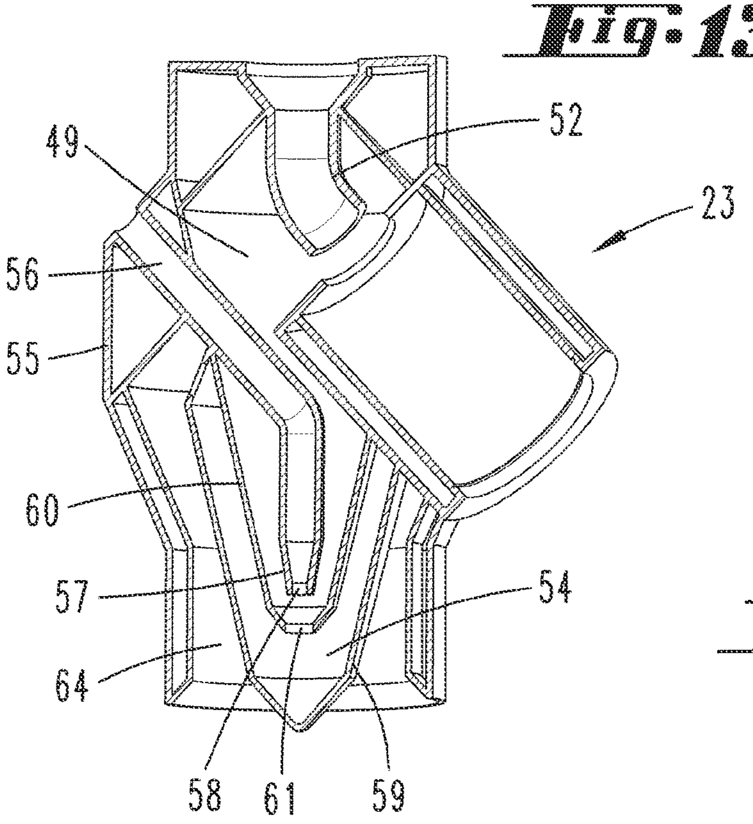
FIG. 13 shows the reactor in another longitudinal sectional view.

During the passivation process of the deposited filtered material 32 (shown schematically in FIGS. 8 to 10), the filter device 2 can be used as described above for filtering the medium 7 guided through the metal printing device 1.

After a possibly predetermined number of cleaning cycles, the filtered material collecting chamber 24 is removed from the filter device 2 and the contents (collected passivated filtered material 32) are fed to a disposal system.

Further, the collecting chamber 24 can have rod-like handling parts 70 aligned transverse to the longitudinal axis x on the outside of the wall, for example in the region of the sleeve portion 65. These handling parts 70 can serve to transport the collecting chamber 24 by hand or by means of a vehicle 71. In addition, a portion of the handling parts 70 can be formed as a handle 82 slidingly displaceable transverse to the longitudinal axis x for acting on a slider 81 serving to latch the filtered material collecting chamber 24 to the gate portion 23. By pulling the handle 82 radially outwards—with respect to the longitudinal axis x—the latching mechanism can be released.

According to FIGS. 14 to 19, transport of the collecting chamber 24 removed from the filter device 2 using a forklift-like vehicle 60 is preferred.

The vehicle 71 preferably comprises a near-ground chassis 72 having wheels 73. A lift mast 74 is mounted on the chassis 72 in substantially vertical alignment, along which substantially horizontally aligned fork arms 75 are arranged to be displaceable in vertical direction, for example driven by a lifting chain. The fork arms 75 are designed for securely gripping the collecting chamber 24, in particular the handling parts 70 thereof. In this respect, for example, a clamping or latching mechanism can be provided for gripping the handling parts 70.

Figure 14:
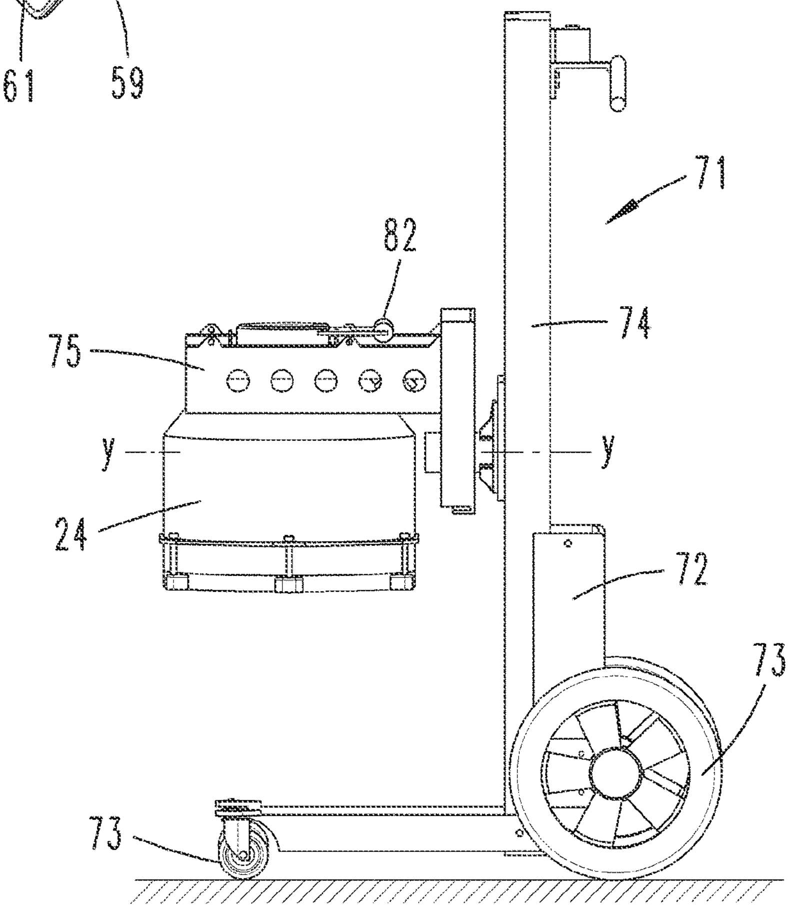
FIG. 14 shows the filtered material collecting chamber removed from the filter device in an arrangement position on a transport vehicle.
Figure 16:
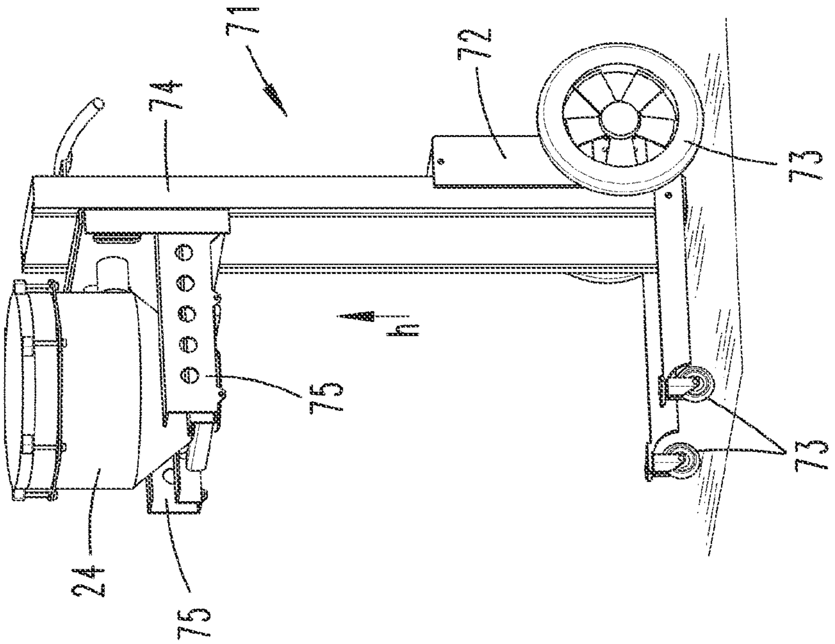
FIG. 16 shows a sequential illustration of FIG. 15 after lifting the filtered material collecting chamber.

As can be seen, the vehicle 71 according to the illustration in FIG. 14 grips the collecting chamber 24 in the region of the handling parts 70. With this gripping, a possibly provided latching of the collecting chamber 24 on the reactor portion 23 of the filter device 2 can be released so that thereafter, the collecting chamber 24 can be transported by means of the vehicle 71.

In the course of removing the filtered material collecting chamber 24 from the reactor portion 23, the valve cone 68 loses its support on the holding-down means 69, as a result of which the shutoff valve 67 automatically falls into a position closing the chamber opening 66 under the action of a compression spring 76.

Figure 15:
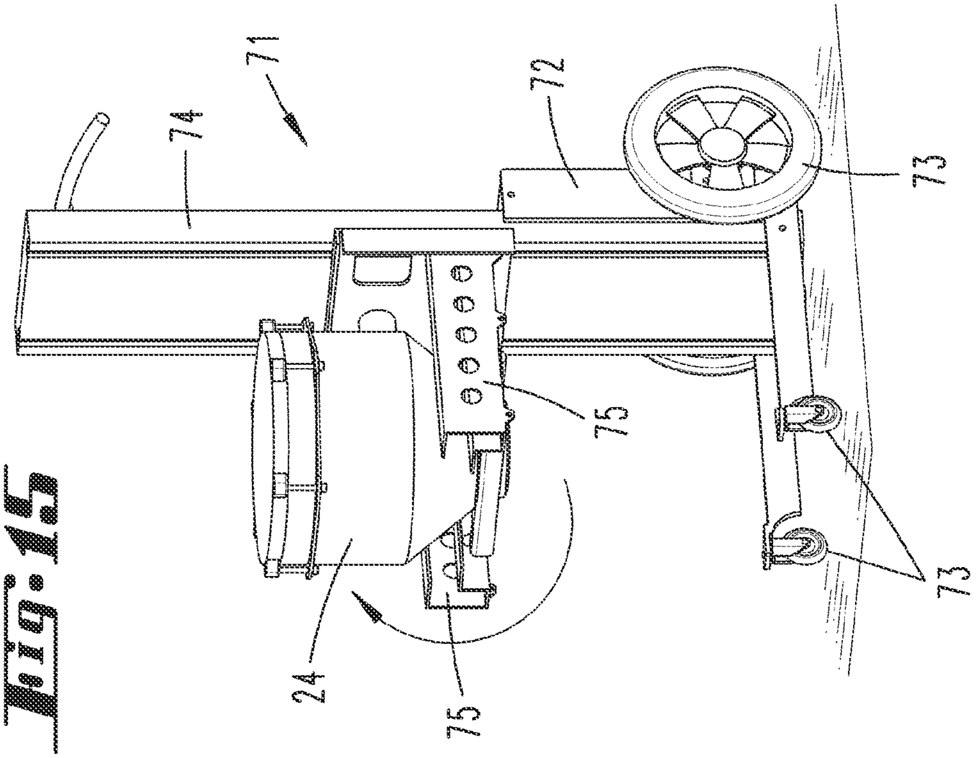
FIG. 15 shows a sequential illustration of FIG. 14 after turning the filter material collecting chamber into an emptying position.

The fork arms 75 together with the collecting chamber 24 are then pivoted by preferably 180° about a geometric pivot axis y directed transverse to the vertical extent of the lift mast 74 so that thereafter, the chamber opening 66 of the collecting chamber 24 points downwards (see FIG. 15).

Figure 17:
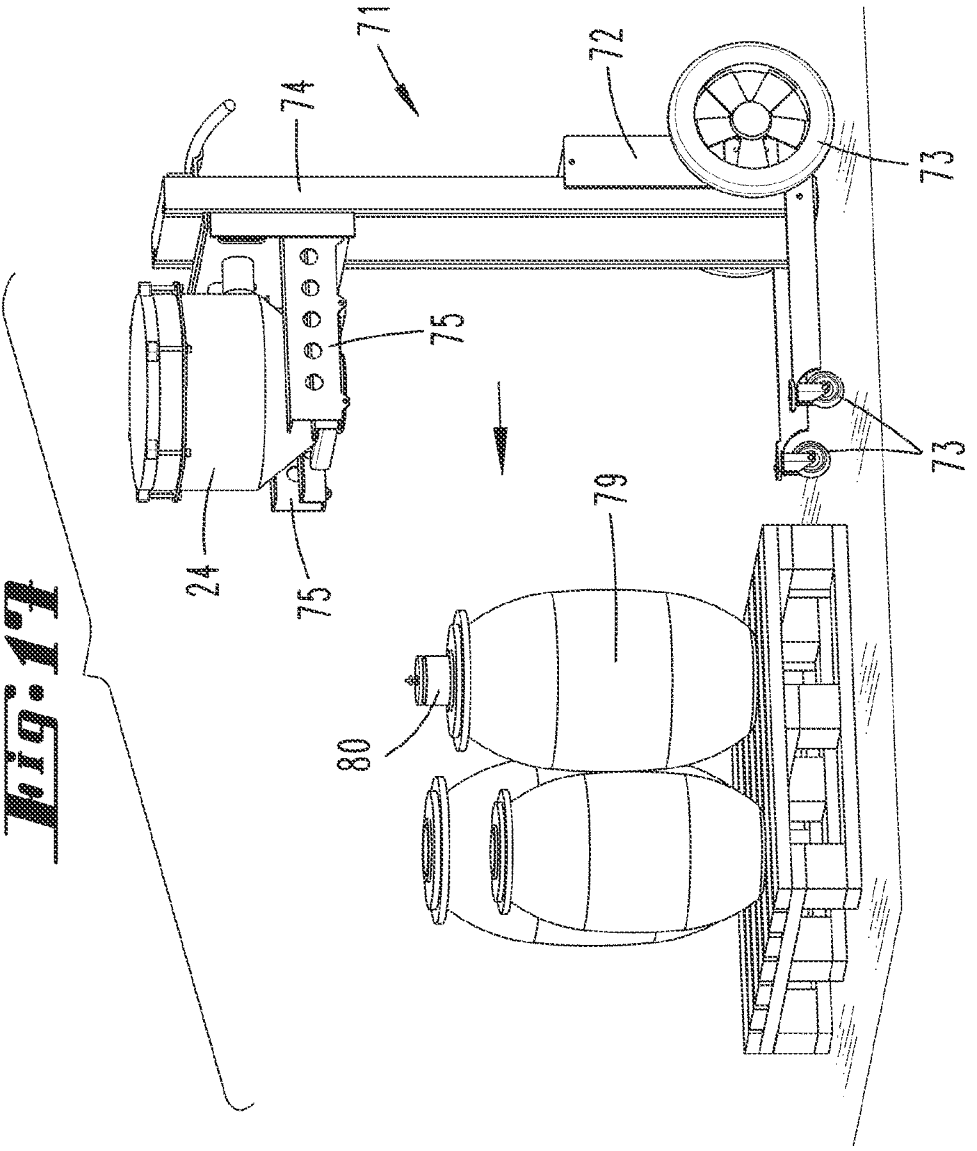
FIG. 17 shows a situation in the course of bringing the filtered material collecting chamber to a disposal container using the transport vehicle.

In this pivoted position, the collecting chamber 24 can optionally be lifted vertically upwards along the lift mast 74 in the direction of the arrow h (see FIG. 16) before feeding the collecting chamber 24 to a disposal container 79 according to FIG. 17 is carried out.

In the region of its filling opening, which is not shown in detail, the disposal container 74 is provided with a pipe-like adapter portion 80 which is preferably designed for sealingly interacting with the sleeve portion 65 of the collecting chamber 24. In this respect, it is preferred to enable a tight connection, as is also substantially the case between the collecting chamber 24 and the reactor portion 23.

Figure 18:
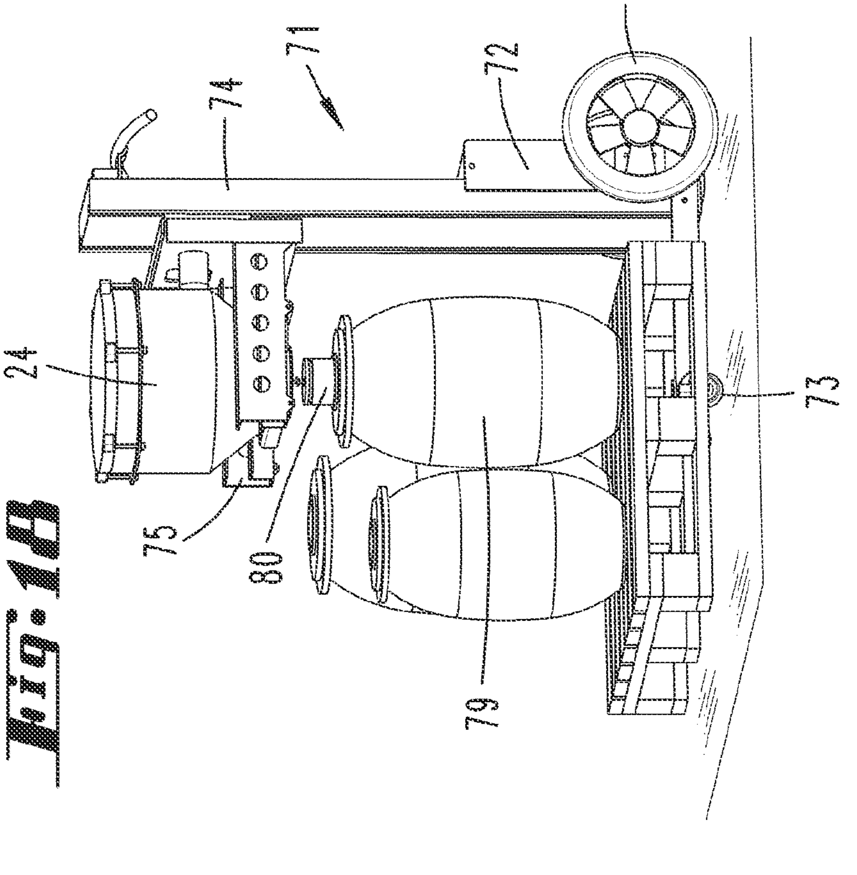
FIG. 18 shows a situation in the course of docking the filtered material collecting chamber to the disposal container.
Figure 19:
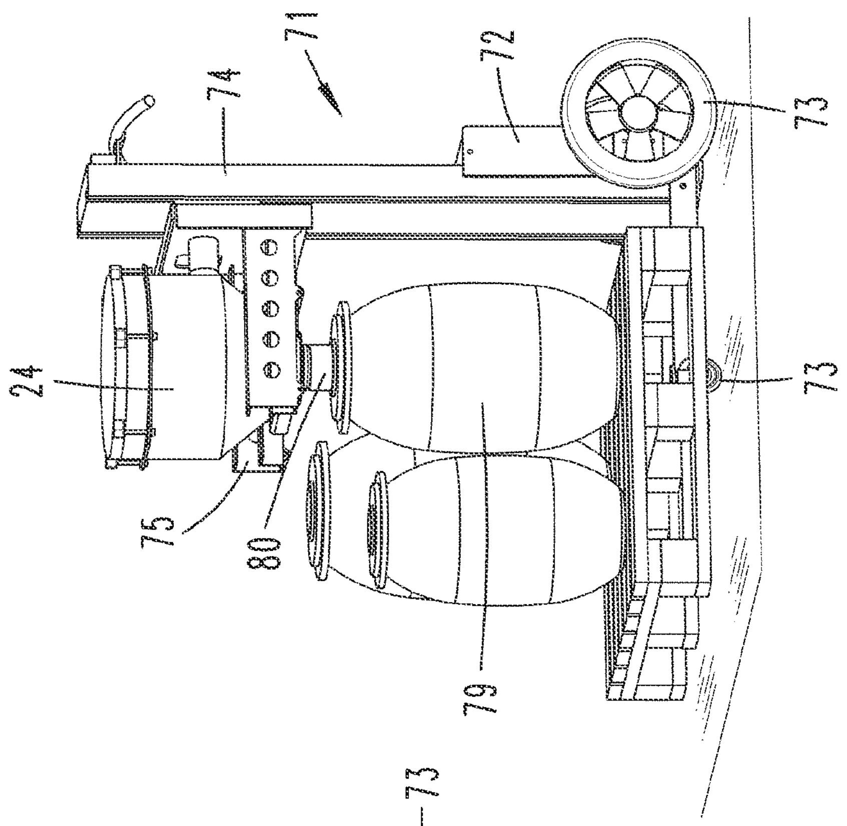
FIG. 19 shows the emptying situation.

According to the schematic illustration in FIG. 18, the collecting chamber 24 is docked onto the adapter portion 80 by correspondingly bringing the collecting chamber 24 closer using the vehicle 71, so that the filtered material 32 received in the collecting chamber 24 can be transferred, preferably solely in a gravity-dependent manner, via the chamber opening 66 into the disposal container 79.

Figure 20:
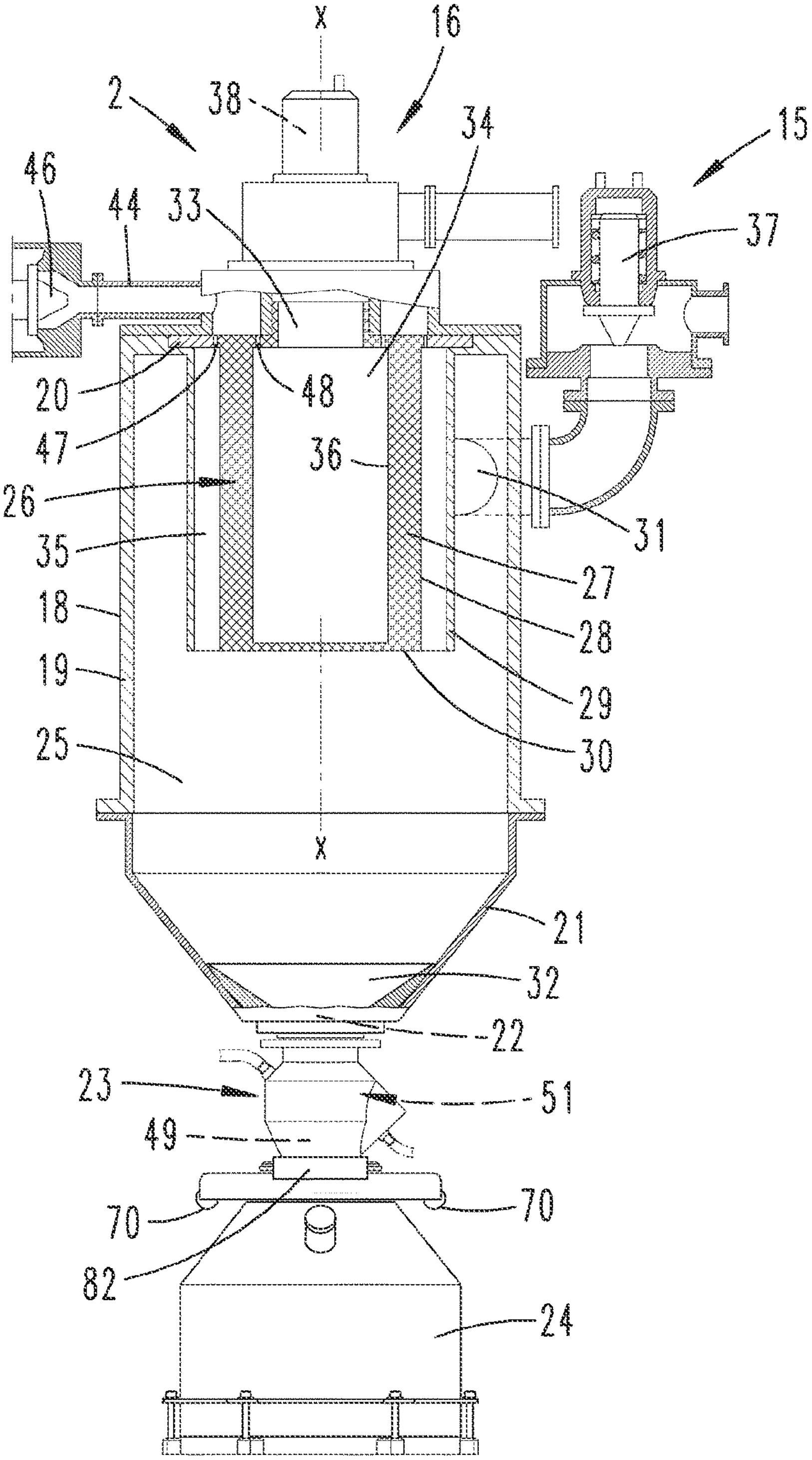
FIG. 20 shows a schematic sectional view of the filter device according to FIG. 3, after the emptied filtered material collecting chamber has been rearranged on the filter device.

Thereafter, the emptied collecting chamber 24 is returned to the filter device 2 by means of the vehicle 71 and is docked there again to the reactor portion 23, without any further post-treatment of the collecting chamber 24 being required (see FIG. 20).

Insofar as reference is made above to process gas, the process gas can be a different medium if the filter device is used in connection with a different medium to be cleaned, that is, in particular, if it is used in a context other than that of a metal printing device.

REFERENCE LIST

1 metal printing device
2 filter device
3 filter module
4 enclosure
5 laser device
6 door
7 medium
8 circulation fan
9 pressure line
10 suction line
11 medium cooler
12 pre-separator
13 micro filter
14 housing
15 medium inlet
16 medium outlet
17 suction transfer line
18 filter housing
19 housing wall
20 housing ceiling
21 housing base
22 base opening
23 reactor portion
24 filtered material collecting chamber
25 interior
26 filter

27 filter wall
28 outer surface
29 guide wall
30 end face
31 inlet opening
32 filtered material
33 outlet opening
34 filter interior
35 annular space
36 inner surface
37 shutoff valve
38 shutoff valve
39 control electronics
40 —
41 vacuum pump
42 —
43 flushing medium reservoir
44 flushing medium
45 flushing medium
46 control valve
47 flushing medium inlet
48 flushing medium inlet
49 space
50 compression spring
51 gate valve
52 channel portion
53 valve disc
54 reaction chamber
55 wall
56 pipeline
57 end portion
58 opening
59 funnel wall
60 funnel wall
61 opening
62 line
63 atmospheric air
64 annular space
65 sleeve portion
66 chamber opening
67 shutoff valve
68 valve cone
69 holding-down means
70 handling part
71 vehicle
72 vehicle
73 wheel
74 lift mast
75 fork arms
76 compression spring
77 inlet
78 inlet
79 disposal container
80 adapter portion
81 slider
82 handle
a direction
b direction
c direction
d direction
e arrow
f direction
g transfer direction
h arrow
x longitudinal axis
y swivel axis

The invention claimed is:

1. A method for cleaning a filter (26) in a filter device (2) having a filter housing (18) and the filter (26) located therein, the filter device (2) having a removable filtered material collecting chamber (24) into which filtered material (32) accumulating in the course of cleaning the filter (26) is transferred, comprising the steps of:

providing a separable space (49) in which the cleaned filtered material (32) is treated with regard to a reduction of any reactivity still present, the separable space being located upstream of the filtered material collecting chamber (24), in a transfer direction (g) of the filtered material (32), conducting passivation, by injecting oxygen, wherein the oxygen is blown into the space (49) or alternatively sucked into the space (49) as a result of an appropriate application of negative pressure, and carrying out a swirling of the filtered material (32) in the space (49) simultaneously with the treatment of the filtered material (32), wherein injected atmospheric air is used both for passivation of the filtered material and for transport into the collecting chamber by blowing the filtered material out of the reactor space.

2. The method according to claim 1, wherein the oxygen is introduced by means of atmospheric air (63).

3. The method according to claim 1, wherein for discharging the filtered material (32) collected at the base of the filter housing (18) into the space (49), a negative pressure is generated via a vacuum pump (41) and a pipeline (56) in the reaction chamber (54).

4. A method for cleaning a filter (26) in a filter device (2) having a filter housing (18) and the filter (26) located therein, the filter device (2) having a removable filtered material collecting chamber (24) into which filtered material (32) accumulating in the course of cleaning the filter (26) is transferred, comprising the steps of:

providing a separable space (49) in which the cleaned filtered material (32) is treated with regard to a reduction of any reactivity still present, the separable space being located upstream of the filtered material collecting chamber (24), in a transfer direction (g) of the filtered material (32), carrying out a swirling of the filtered material (32) in the space (49), removing the filtered material collecting chamber (24) from the filter device (2) after a certain time, and feeding the contents to a disposal system.

5. The method according to claim 4, wherein the treatment is carried out by injecting oxygen.

6. The method according to claim 4, wherein the swirling is carried out at the same time as the treatment of the filtered material (32).

7. A filter device (2) comprising:

a filter housing (18) and a filter (26) located in the filter housing, the filter device (2) having a removable filtered material collecting chamber (24) into which filtered material (32) accumulating in the course of cleaning the filter (26) can be transferred, wherein a separable space (49) is provided upstream of the filtered material collecting chamber (24) in a transfer direction (g) of the filtered material (32), the separable space being configured for treating the cleaned filtered material (32) with regard to a reduction of any reactivity still present, and configured for a passivation, wherein the filtered material collecting chamber (24) is configured to be removed from the filter device (2) after a cleaning cycle in order to feed the contents to a disposal system, and wherein the separable space is configured such that atmospheric air can be injected into the space, and in addition to the passivation, a swirling and also a transfer of the filtered material into the filtered material collecting chamber (24) can be carried out by means of the atmospheric air.

8. The filter device (2) according to claim 7, wherein the separable space (49) formed in a reactor portion (23) forms a funnel-like reaction chamber (54) which narrows in a direction of the filtered material collecting chamber (24), and wherein as a result of opening of a gate valve (51), the collected filtered material (32) is dischargeable into the reaction chamber (54) after a controlled release.

9. The filter device (2) according to claim 8, wherein a pipeline (56) which is fed to the outside through a wall of the reactor portion (23) opens into the reaction chamber (54) and is connected to a vacuum pump in a flow-tight manner.

* * * * *